(12) United States Patent
Mazzocchi

(10) Patent No.: US 9,415,738 B2
(45) Date of Patent: Aug. 16, 2016

(54) ANTI-RATTLE INTERFACE FOR AIRBAG CHUTE TO AIRBAG MODULE

(71) Applicant: Ford Global Technologies, LLC, Dearborn, MI (US)

(72) Inventor: Nicholas Andrew Mazzocchi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/578,592

(22) Filed: Dec. 22, 2014

(65) Prior Publication Data

US 2016/0176376 A1  Jun. 23, 2016

(51) Int. Cl.
*B60R 21/205* (2011.01)
*B60R 21/215* (2011.01)
*B60R 21/217* (2011.01)

(52) U.S. Cl.
CPC ............. *B60R 21/205* (2013.01); *B60R 21/215* (2013.01); *B60R 2021/2172* (2013.01)

(58) Field of Classification Search
CPC .. B60R 21/205; B60R 21/215; B60R 21/217; B60R 2021/161; B60R 2021/2172; B60R 2021/21506
See application file for complete search history.

(56) References Cited

U.S. PATENT DOCUMENTS

| | | | |
|---|---|---|---|
| 5,312,129 A | 5/1994 | Ogawa | |
| 5,348,339 A | 9/1994 | Turner | |
| 5,445,409 A | 8/1995 | Abramczyk et al. | |
| 5,536,037 A * | 7/1996 | Cherry | B60R 21/2165 280/728.3 |
| 5,618,485 A * | 4/1997 | Gajewski | B29C 37/0057 264/255 |
| 5,816,608 A * | 10/1998 | Tanabe | 280/728.2 |
| 6,325,407 B1 | 12/2001 | Soderquist | |
| 6,371,508 B1 * | 4/2002 | Baur | B60R 21/2171 280/728.2 |
| 6,409,208 B1 | 6/2002 | Frisch et al. | |
| 6,557,886 B1 * | 5/2003 | Sakaguchi | B60R 21/215 280/728.2 |
| 6,702,319 B2 | 3/2004 | Sczeburek et al. | |
| 7,244,383 B2 * | 7/2007 | Youngs | B60R 11/00 264/255 |
| 7,293,794 B2 * | 11/2007 | Clarke | B60R 21/2035 280/731 |
| 7,784,820 B2 * | 8/2010 | Mazzocchi et al. | 280/728.3 |
| 7,914,039 B2 * | 3/2011 | Mazzocchi et al. | 280/732 |
| 8,012,393 B2 * | 9/2011 | Hager | B29C 45/1635 264/251 |
| 8,336,908 B1 * | 12/2012 | Kalisz et al. | 280/728.3 |
| 8,469,393 B1 * | 6/2013 | Siewert et al. | 280/728.3 |
| 2003/0209890 A1 * | 11/2003 | Totani | B29C 37/0057 280/728.3 |
| 2005/0212268 A1 * | 9/2005 | Nagy | B60R 21/215 280/728.2 |
| 2006/0214399 A1 * | 9/2006 | Okamoto et al. | 280/728.3 |
| 2007/0187939 A1 * | 8/2007 | Latour et al. | 280/808 |
| 2010/0230938 A1 * | 9/2010 | Mazzocchi et al. | 280/732 |
| 2010/0295275 A1 * | 11/2010 | Yeon | B60R 21/215 280/728.3 |
| 2011/0062685 A1 * | 3/2011 | Kim et al. | 280/728.3 |
| 2011/0248482 A1 * | 10/2011 | Kim | 280/728.3 |
| 2013/0076010 A1 * | 3/2013 | Yoshimura et al. | 280/728.2 |
| 2014/0265261 A1 * | 9/2014 | Surdu et al. | 280/728.2 |

* cited by examiner

*Primary Examiner* — James English
(74) *Attorney, Agent, or Firm* — Vichit Chea; Price Heneveld LLP

(57) ABSTRACT

A vehicle airbag assembly includes a chute including a side wall defining an aperture with a top side and a bottom side. A first retention tab extends from the top side, and a second retention tab extends from the bottom side. The assembly also includes an airbag module including a housing enclosing a deployable airbag and a hook coupled with the housing to engage with the aperture between the first tab and the second tab.

20 Claims, 4 Drawing Sheets

ANTI-RATTLE INTERFACE FOR AIRBAG CHUTE TO AIRBAG MODULE

FIELD OF THE INVENTION

The present invention generally relates to an interface structure for attachment of an airbag module to an airbag chute. In particular, first and second retention tabs extend from opposing sides of an aperture in the chute to engage with a hook coupled with the module.

BACKGROUND OF THE INVENTION

Automotive airbag systems include an airbag module mounted within a housing that is concealed beneath a surface of the vehicle interior. In particular, passenger airbag systems may include a chute defined by the housing and extending within the dashboard of the associated vehicle. The chute may be concealed beneath a surface of the dashboard or instrument panel substrate and may be supported by the underlying structure of the instrument panel. An airbag module, including the actual airbag and the propellant source, is coupled with the chute and is at least partially positioned therein such that a deploying airbag is guided toward a moveable door of the chute, whereupon it ruptures the instrument panel substrate and deploys therefrom.

The coupling of an airbag module within the corresponding chute may be achieved by mutually-engaging structures. In one example, a plurality of hooks are coupled with the housing of the module and engage with a number of features, such as windows or the like, in one or more walls of the chute. Such a window may include a generally flat lower surface that supports the hook and, accordingly, bears a portion of the weight of the module. Features have been incorporated into such windows to maintain a hook in contact with a corresponding window surface, however, rattling and squeaking of such hooks against portions of the chute may still occur in response to vibration of the vehicle. Accordingly, further advances may be desired.

SUMMARY OF THE INVENTION

According to one aspect of the present invention, a vehicle airbag assembly includes a chute including a side wall defining an aperture with a top side and a bottom side. A first retention tab extends from the top side, and a second retention tab extends from the bottom side. The assembly also includes an airbag module including a housing enclosing a deployable airbag and a hook coupled with the housing to engage with the aperture between the first tab and the second tab.

According to another aspect of the present invention, a chute for a vehicle airbag assembly includes a body defining an interior, a top opening, and a bottom opening. The chute includes a side wall and a door extending over the top opening. An aperture is defined within the side wall and has a top side, a bottom side, a first retention tab extending from the top side, and a second retention tab extending from the bottom side.

According to another aspect of the present invention, a chute for a vehicle airbag assembly includes a body of a plastic material defining an interior and a top opening and having a side wall. An aperture is defined within the side wall and has a top side and a bottom side. A first retention tab extends from the top side. A second retention tab extends from the bottom side and is at least partially of a thermoplastic elastomer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
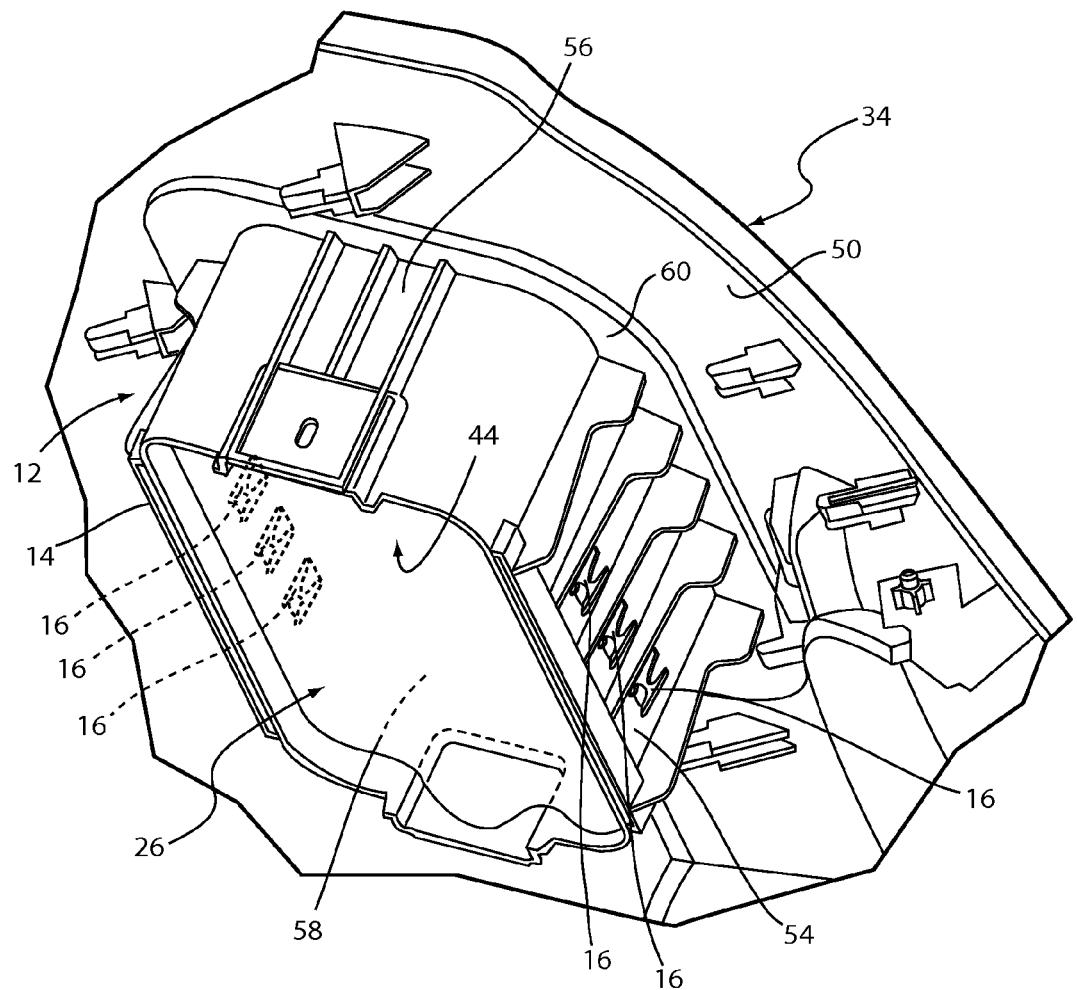
FIG. 1 is a is a perspective view of the airbag module and adjacent instrument panel components.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
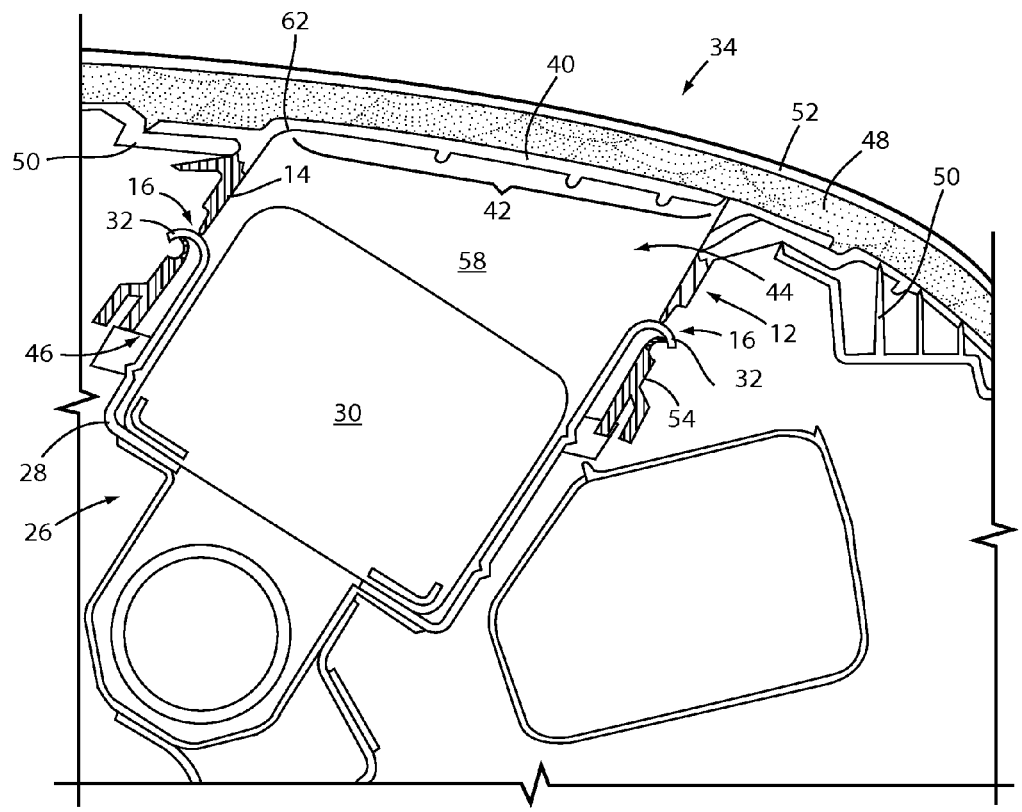
FIG. 2 is a cross-sectional perspective view is a cross-sectional view, taken along line A-A of FIG. 1, of an airbag module and associated instrument panel components according to the present disclosure.

Referring to FIGS. 1 and 2, reference numeral 10 generally designates a vehicle airbag assembly. Airbag assembly 10 includes a chute 12 having a side wall 14 defining an aperture 16 with a top side 18 and bottom side 20. A first retention tab 22 extends from the top side 18, and a second retention tab 24 extends from the bottom side 20 of aperture 16. Airbag assembly 10 further includes an airbag module 26 including a housing 28 enclosing an employable airbag 30. A hook 32 (FIG. 2) is coupled with housing 28 and engages with aperture 16 of chute 12 between the first tab 22 and the second tab 24.

Figure 3:
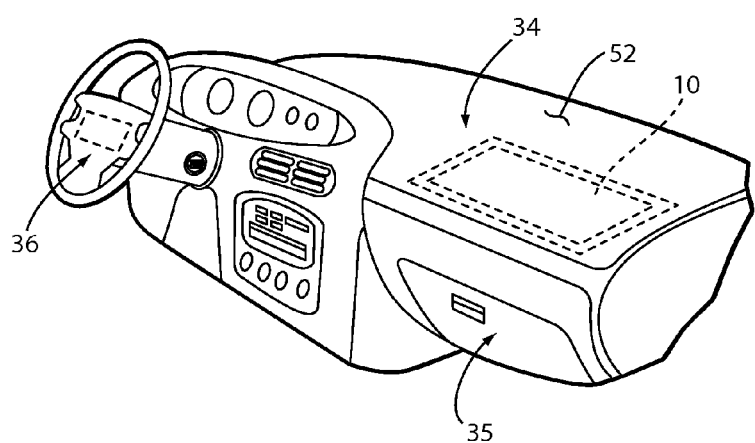
FIG. 3 is a perspective view of an interior compartment of an automobile having an airbag module and related instrument panel components.

As shown in FIG. 3, an interior of an automobile is illustrated having airbag assembly 10 located proximate an instrument panel 34. In the illustrated embodiment, the airbag assembly 10 is configured in a "top mount" position, in which the assembly 10 is adjacent an instrument panel 34. According to another embodiment, the airbag assembly 10 could be configured in a "front mount" position, in which the airbag assembly 10 is positioned proximate a glove box 35. Additionally or alternatively, the automobile may have an airbag assembly, which may be suitable for use with connection with steering wheel 36. Various other examples of an airbag assembly may be located elsewhere in the vehicle and various other embodiments.

Returning to FIGS. 1 and 2, airbag assembly 10 includes a chute 12 for at least partially enclosing or surrounding airbag module 26. Chute 12, as discussed above, can be positioned within the instrument panel 34 or steering wheel 36 of a vehicle, for example, for mounting of airbag module 26 therein in an assembly of the two components. Chute 12 also includes a top wall in the form of a moveable panel or door 40 that is positioned within or over an upper opening 42 to an interior 44 of chute 12. As shown in FIG. 2, airbag module 26 is positionable within an opposite lower opening 46 so as to at least partially extend into interior 44 of chute 12. Foam layer 48 is positioned such that a portion thereof lies atop door 40 and over a portion of an internal support structure 50 of an instrument panel 34 (or at least a portion thereof). The shape of foam layer 48 and the door 40 of chute 12 both substantially correspond to the shape of an outer substrate 52 of instrument panel 34.

Chute 12 also includes a plurality of walls described as the aforementioned side wall 14, which may be further referred to as front side wall 14, a rear side wall 54, and two side walls 56 and 58, which extend downwardly from door 40. The plurality of walls 14, 54, 56, and 58 together define the aforementioned interior 44 of chute 12 and surround both upper opening 42 and lower opening 46 of chute 12. As mentioned previously, front side wall 14 can include at least one aperture therein for engagement with a corresponding attachment hook 32 extending from airbag module 26. As further shown in FIGS. 1 and 2, front side wall 14 as well as rear wall 54 can include a plurality of such apertures 16 to engage with a corresponding number of respective hooks 32 extending from airbag module 26. In the example illustrated, each of front wall 14 and rear wall 54 include four of such apertures 16, although other numbers of apertures 16, which may be at the same or different with respect to front side wall 14 and rear wall 54, are possible. Further aspects of apertures 16, including the engagement between apertures 16 and the corresponding hooks 32 are discussed further below.

As illustrated in FIGS. 1 and 2, door 40 extends over at least a portion of upper opening 42 so as to provide support for the portion of foam layer 48 and substrate 52 that extend thereover. An outer flange 60 can surround upper opening 42 and may extend integrally from near the upper end of walls 14, 54, 56, and 58. Further, door 40 may be somewhat smaller than opening 42 to provide for clearance or the like during airbag deployment and may be detached from walls 14, 56, and 58. A hinge portion 62 may attach door 40 to chute 12 at wall 54 to allow for opening of door 40 with respect to chute 12 by flexing thereof. Alternatively, chute 12 and door 40 may be in a fully-sealed configuration with a tear seam (e.g. a thinned or otherwise weakened boundary area) extending between door 40 and walls 14, 54, 56, and 58. Still further, door 40 can be sealed relative to chute 12 by a topper (not shown) that is assembled between chute 12 (e.g. over door 40 and flange 60) and the overlying portion of foam layer 48.

As mentioned above, hinge 62 extends between, for example, wall 54 of chute 12 and adjacent portion of door 40 to provide a flexible attachment for door 40 to chute 12. Hinge 62 may be integrally formed in a single piece of material with chute 12 and may further be integrally formed with door 40 such that chute 12, door 40, and hinge 62 are of a single piece of material, which may be a somewhat flexible polymeric material, for example Dexflex™ or another material that exhibits a level of ductility at cold temperatures (at least to −32° C.) and acceptable toughness at high temperatures (at least to 90° C.). Other materials such as Thermoplastic Olefin ("TPO") may also be used. It is such material flexibility that allows door 40 to move with respect to chute 12 during airbag deployment, which may include flexing of hinge 62 as well as adjacent portions of door 40.

Figure 4:
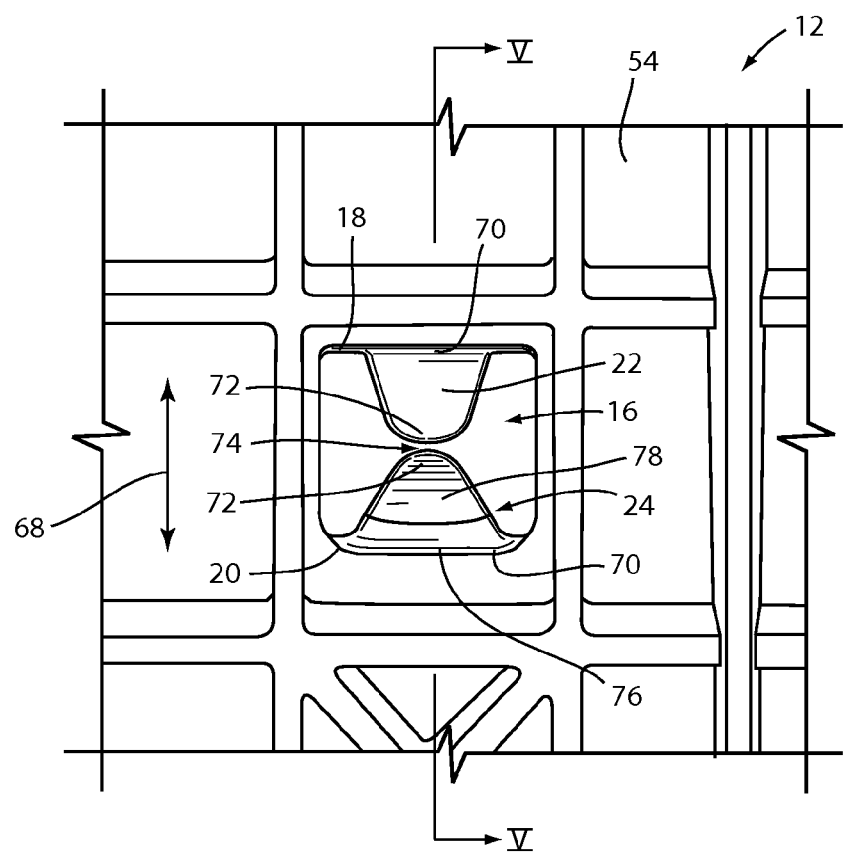
FIG. 4 is a detail view of an airbag chute showing an interface structure for coupling with an airbag module and chute.
Figure 5:
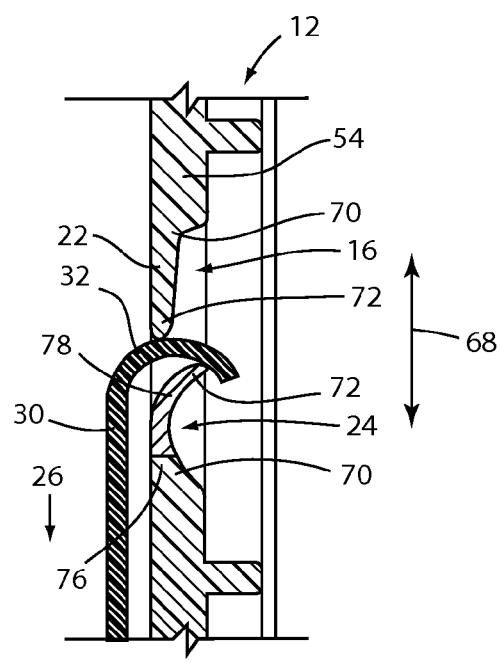
FIG. 5 is a cross-sectional detail view of the interface structure of FIG. 4 assembled with a portion of an airbag module.

Further aspects of the aforementioned apertures 16 are now described with respect to FIG. 4 and FIG. 5, in which a view of one such aperture 16 is illustrated in front side wall 14 of chute 12, further instances of aperture 16 being also included in a horizontally-spaced and aligned arrangement along front wall 14 and, optionally, included along rear wall 54. As mentioned previously, multiple apertures 16 can also extend in a generally horizontal direction (i.e. so has to be laterally-aligned) within both front side wall 14 and rear wall 54, the particular number of such apertures 16 corresponding with a number of hooks 32 coupled with airbag module 26. Each such aperture 16 includes a first tab 22 extending from a top side 18 of aperture 16 and a second tab 24 extending from a bottom side 20 of aperture 16. As illustrated first tab 22 and second tab 24 are generally aligned in a vertical direction 68 and extend within aperture 16 toward one another from respective bases 70 thereof that are coupled with top side 18 of aperture 16 and bottom side 20 of aperture 16, respectively, to corresponding tips 72 that are spaced apart from each other so as to define a gap 74. In an embodiment, gap 74 may be smaller than a thickness of a corresponding hook 32 at a point of engagement therebetween (when in a non-deflected state such as prior to assembly with hook 32) such that, as shown in the side cross section view of FIG. 5, some deformation of at least second tab 24 occurs when hook 32 is assembled with aperture 16, as discussed further below.

As shown in FIG. 4, both first tab 22 and second tab 24 can taper inwardly within a plane generally defined by the corresponding wall 14 or 54 in which aperture 16 is positioned. As shown, such a taper can be from a greater width along the respective bases 70 of tabs 22 and 24 to a generally more narrow width adjacent the respective tips 72 thereof, which themselves can be generally rounded. Additionally, as shown in FIG. 5, tabs 22 and 24 can also taper inwardly between respective bases 70 and tips 72 within a plane transverse to the corresponding side wall 14 or 54. Such a tapered profile can allow tabs 22 and 24 to exhibit levels of resilient deformability such as by bending inwardly or outwardly with respect to apertures 16, with such deformability being generally progressive in nature such that tabs 22 and 24 are generally more flexible toward the respective tips 72 than near the respective bases 70. This arrangement can allow for adequate strength of tabs 22 and 24 adjacent the top side 18 and bottom side 20 of apertures 16, respectively, such that tabs 22 and 24 are of a sufficient strength adjacent the location of coupling with the respective side wall 14 or 54 to prevent or reduce breakage thereof during instillation of airbag module 26 with chute 12 or during normal use, such as prior to any deployment of airbag 30. The tapering of tabs 22 and 24 can also result in a progressive deformability thereof such that tabs 22 and 24 are generally more flexible in areas adjacent the tips 72 thereof and become less deformable toward the respective bases 70 such that tabs 22 and 24 become progressively harder to deflect under increasing force applied thereto.

As shown in FIG. 5, when airbag module 26 is assembled with the chute 12, hook 32 engages with aperture 16 by being positioned within the gap 74 between the receptive tips 72 of tab 22 and tab 24. As discussed above, the gap 74 can be undersized with respect to a material thickness of hook 32 such that when hook 32 is assembled with aperture 16 at least one of tabs 22 and 24 is deflected. This arrangement can result in aperture 16 providing at least some degree of force on the respective hook 32 to provide a generally secure coupling there between. This arrangement can prevent rattling of hook 32 with an aperture during vibration of the associated vehicle. Further, the varying degrees of flexibility provided by both tab 22 and tab 24 can be such that hook 32 remains generally engaged with aperture 16 by being in generally continuous contact with first tab 22 and second tab 24 during any upward or downward movement or shifting of airbag module 26 with respect to chute 12. This arrangement can further prevent any rattling between hook 32 and aperture 16 by maintaining both first tab 22 and second tab 24 in generally constant contact with the respective hook 32 during a routine potential range of motion for hook 32 or airbag module 26 with respect to aperture 16 or chute 12. Further, the generally flexible nature of first tab 22 and second tab 24 in an inward or outward direction with respect to aperture 16 can allow for flexing of tabs 22 and 24 during any forward or backward movement of airbag module with respect to chute 12 which may reduce squeaking or other undesirable noises that may otherwise occur.

As further shown in FIG. 5, second tab 24 can be constructed to be generally more flexible than first tab 22. In such an arrangement, second tab 24 can generally act in a shock-absorbing role, permitting certain amounts of travel of hook 32 with respect to aperture 16 in the vertical direction 68. To facilitate such an arrangement, second tab 24 can have a two-part construction, wherein a first portion 76 thereof, positioned adjacent to and including base 70 thereof, can be formed of a more ridged material, including the same thermoplastic material of chute 12 in general. A second portion 78 of second tab 24 can be coupled with first portion 76 and can extend away therefrom toward tip 72 thereof. Second portion 78 of second tab 24 can be of a generally softer, more deformable material as compared to first portion 76. In an example, second portion 78 can be of Thermoplastic Elastomer ("TPE") that can be insert molded (e.g., over-molded) so as to adhere with first portion 76 during a subsequent manufacturing step. In such an arrangement, first portion 76 can be integrally formed with the remainder of chute 12, with second portions 78 formed so as to at least partially cover or otherwise extend at least partially over some of first portions 76. Accordingly, some of first portions 76 may extend within and generally provide additional support for second portion 78. In a further embodiment, first tab 22 can be of a similar construction, with the same or different portions of a corresponding more ridged portion thereof to a correspondingly more flexible portion.

Figure 6:
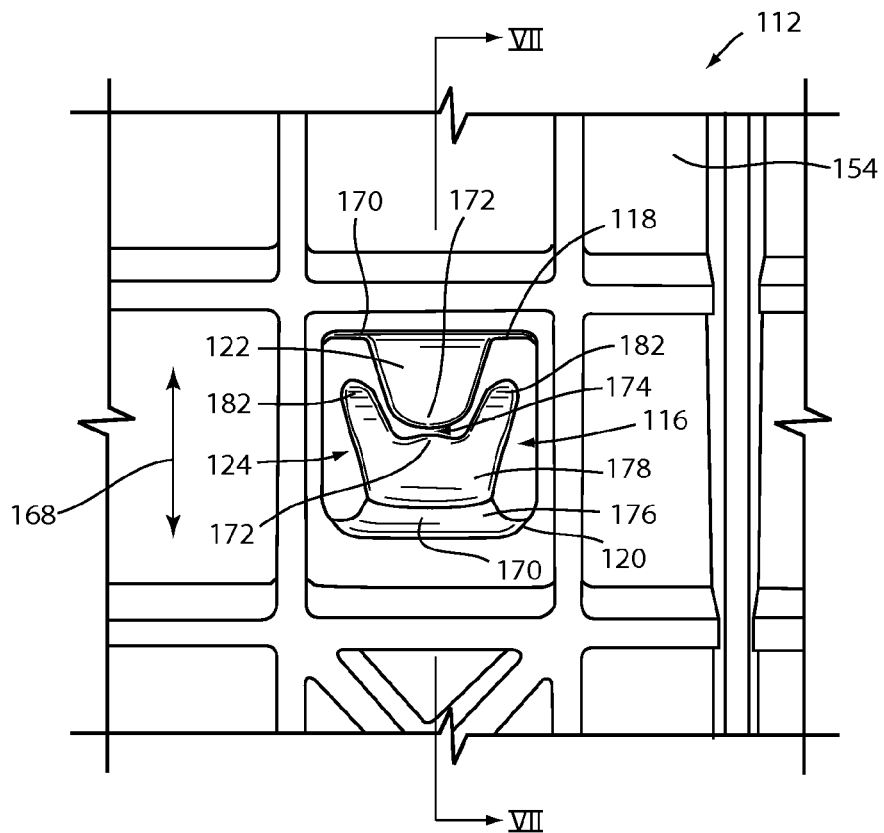
FIG. 6 is a detail view of an airbag chute showing an alternative interface structure for coupling with an airbag module and chute.
Figure 7:
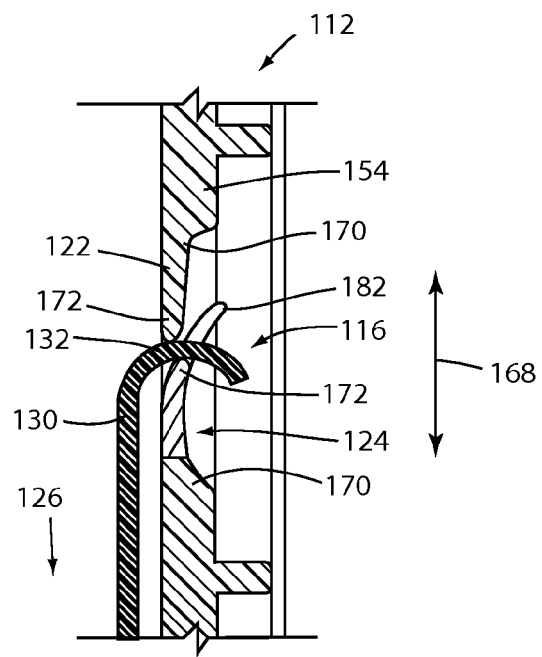
FIG. 7 is a cross-sectional detail view of the interface structure of FIG. 4 assembled with a portion of an airbag module.

A further embodiment of a chute 112 that can be used in an airbag assembly similar to assembly 10 shown in FIG. 3 is shown in FIG. 6 and FIG. 7. In such an arrangement, chute 112 can be of a generally similar construction to chute 12 shown in FIGS. 1 and 2 with one or more apertures 116 present in one or more of a front wall 114 and/or an opposing rear wall 54. Aperture 116 includes a first tab 122 extending from a top side 118 of aperture 116, and a second retention tab 124 extending from a bottom side 120 of aperture 116. As in the previously-discussed embodiment, first tab 122 and second tab 124 extend generally towards each other in a vertical direction 168 between respective bases 170 and respective generally rounded tips 172 thereof. Tabs 122 and 124 are arranged to provide a gap 174 there between that is generally undersized relative to a corresponding hook 132 of an airbag module 126 assembled with chute 112. As previously discussed, gap 174 can be undersized with respect to hook 132 such that aperture 116 applies a generally constant force on hook 132.

In the embodiment illustrated in FIGS. 6 and 7, second tab 124 defines the two fork arms 182 extending from laterally-opposite sides of tip 172 so as to extend generally upwardly in vertical direction 168 and outwardly to partially surround first retention tab 122. In one embodiment, fork arms 182 can be within a second portion 178 of second tab 124 that is of a generally more deformable material than a corresponding first portion 176, as discussed above. Such a construction of second tab 124 can be such that tip 172 of second tab 124 is positioned in a valley formed between the fork arms 182 so as to be laterally spaced on opposite sides of hook 132 when assembled with apertures 116, when assembled therewith. This arrangement can help to restrict any lateral movement of hook 32 with respect to tabs 122 and 124, and accordingly with respect to aperture 116. This can further reduce vibration, squeaking, or other noises due to vibration at the interface between hook 132 and aperture 116. This arrangement can further result in potentially robust coupling between airbag module 126 and chute 112.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle airbag assembly, comprising:
a chute including a side wall defining an aperture with a top side and a bottom side, a first retention tab extending from the top side, and a second retention tab extending from the bottom side; and
an airbag module including a housing enclosing a deployable airbag and a hook coupled with the housing to engage with the aperture between the first tab and the second tab.

2. The vehicle airbag assembly of claim 1, wherein the first tab and the second tab are aligned in a vertical direction.

3. The vehicle airbag assembly of claim 1, wherein the first tab and the second tab extend inwardly within the aperture toward one another.

4. The vehicle airbag assembly of claim 1, wherein the chute is of a thermoplastic material and second tab is at least partially of a thermoplastic elastomer.

5. The vehicle airbag assembly of claim 4, wherein:
a first portion of the second tab is of the thermoplastic material and extends integrally from a portion of the chute adjacent the aperture; and
a second portion of the second tab is of the thermoplastic elastomer, at least partially covers the first portion, and is coupled with the first portion by being insert molded thereover.

6. The vehicle airbag assembly of claim 1, wherein the hook engages with the aperture between the first tab and the second tab including by deflection of at least the second tab.

7. The vehicle airbag assembly of claim 6, wherein:
the hook has a first thickness at least in a vertical direction along a point of engagement with the first tab and the second tab; and
the first tab and the second tab define a gap therebetween when in respective, non-deflected positions, the gap extending in a distance in the vertical direction that is less than the first thickness of the hook.

8. The vehicle airbag assembly of claim 1, wherein the chute is coupled with a support structure of a vehicle instrument panel.

9. A chute for a vehicle airbag assembly, comprising:
a body defining an interior, a top opening and a bottom opening and having a side wall;
a door extending over the top opening; and
an aperture defined within the side wall and having a top side, a bottom side, a first retention tab extending from the top side, and a second retention tab extending from the bottom side.

10. The chute of claim 9, wherein:
the side wall is a front side wall;
the aperture is a first aperture and is defined within the front side wall;
the body of the chute includes a rear side wall opposite the interior from the first side wall; and
the chute further includes a second aperture defined within the rear side wall and having a top side, a bottom side, a first retention tab extending from the top side, and a second retention tab extending from the bottom side.

11. The chute of claim 9, wherein:
the aperture is a first aperture; and
the chute further includes a second aperture defined within the side wall generally horizontally aligned with the first aperture and having a top side, a bottom side, a first retention tab extending from the top side, and a second retention tab extending from the bottom side.

12. The chute of claim 9, wherein:
the body is of a thermoplastic material; and
the second tab is at least partially of a thermoplastic elastomer.

13. The chute of claim 12, wherein:
a first portion of the second tab is of the thermoplastic material and extends integrally from a portion of the body adjacent the aperture; and
a second portion of the second tab is of the thermoplastic elastomer, at least partially covers the first portion, and is coupled with the first portion by being insert molded thereover.

14. The chute of claim 9, wherein the first tab is tapered inwardly within a plane defined by the aperture and defines a rounded tip opposite the top side of the aperture.

15. The chute of claim 14, wherein the second tab is tapered inwardly within the plane defined by the aperture and defines a rounded tip opposite the bottom side of the aperture.

16. The chute of claim 9, wherein the second tab defines first and second fork arms at least partially surrounding the first tab within the plane.

17. A chute for a vehicle airbag assembly, comprising:
a body of a plastic material defining an interior and a top opening and including a side wall; and
an aperture defined within the side wall and having a top side, a bottom side, a first retention tab extending from the top side, and a second retention tab extending from the bottom side and being at least partially of a thermoplastic elastomer.

18. The chute of claim 17, further including a door coupled with the side wall and extending over the top opening.

19. The chute of claim 17, wherein the body further includes a flange extending outwardly opposite the interior adjacent the top opening.

20. The chute of claim 17, wherein:
a first portion of the second tab is of the thermoplastic material and extends integrally from a portion of the body adjacent the aperture; and
a second portion of the second tab is of the thermoplastic elastomer and at least partially covers the first portion.

* * * * *